United States Patent
Huang

Patent Number: 6,124,785
Date of Patent: Sep. 26, 2000

[54] PRESSURE GAUGE FOR A PNEUMATIC TIRE

[76] Inventor: Tien-Tsai Huang, No. 4, Lane 30, Wu-Chuan St., Pan-Chiao City, Taipei Hsien, Taiwan

[21] Appl. No.: 09/299,523

[22] Filed: Apr. 26, 1999

[51] Int. Cl.[7] .................................................. B60C 23/00
[52] U.S. Cl. ...................... 340/442; 73/146.5; 116/34 R; 340/447
[58] Field of Search .................................... 340/447, 442, 340/445, 448; 73/146.5, 146.3, 146.4, 146.8; 116/34 R; 200/61.25, 61.22, 61.26; 152/416, 417, 418

[56] References Cited

U.S. PATENT DOCUMENTS

| | | | |
|---|---|---|---|
| 4,048,614 | 9/1977 | Shumway. | |
| 5,130,694 | 7/1992 | Zaihaleian | 340/442 |
| 5,289,161 | 2/1994 | Huang | 340/447 |
| 5,355,924 | 10/1994 | Olney | 152/418 |
| 5,694,111 | 12/1997 | Huang | 340/442 |
| 5,798,689 | 8/1998 | Huang | 340/447 |
| 6,058,768 | 5/2000 | Huang | 340/448 |

*Primary Examiner*—Brent A. Swarthout
*Attorney, Agent, or Firm*—Ladas & Parry

[57] ABSTRACT

A pressure gauge has a pressure-sensing unit including an inner casing that contains a pressure-responsive contact unit, a conductive high-pressure contact unit and a conductive low-pressure contact unit. The pressure-responsive contact unit includes an air impervious and length variable tubular member, and a conductive contact member on one end of the tubular member. In the event of an over-inflated condition, the pressure-responsive contact unit moves in the inner casing to establish physical contact with the high-pressure contact unit, thereby controlling a signal-transmitting unit to transmit a first pressure signal. In the event of an under-inflated condition, the pressure-responsive contact unit moves in the inner casing to establish physical contact with the low-pressure contact unit, thereby controlling the signal-transmitting unit to transmit a second pressure signal.

20 Claims, 13 Drawing Sheets

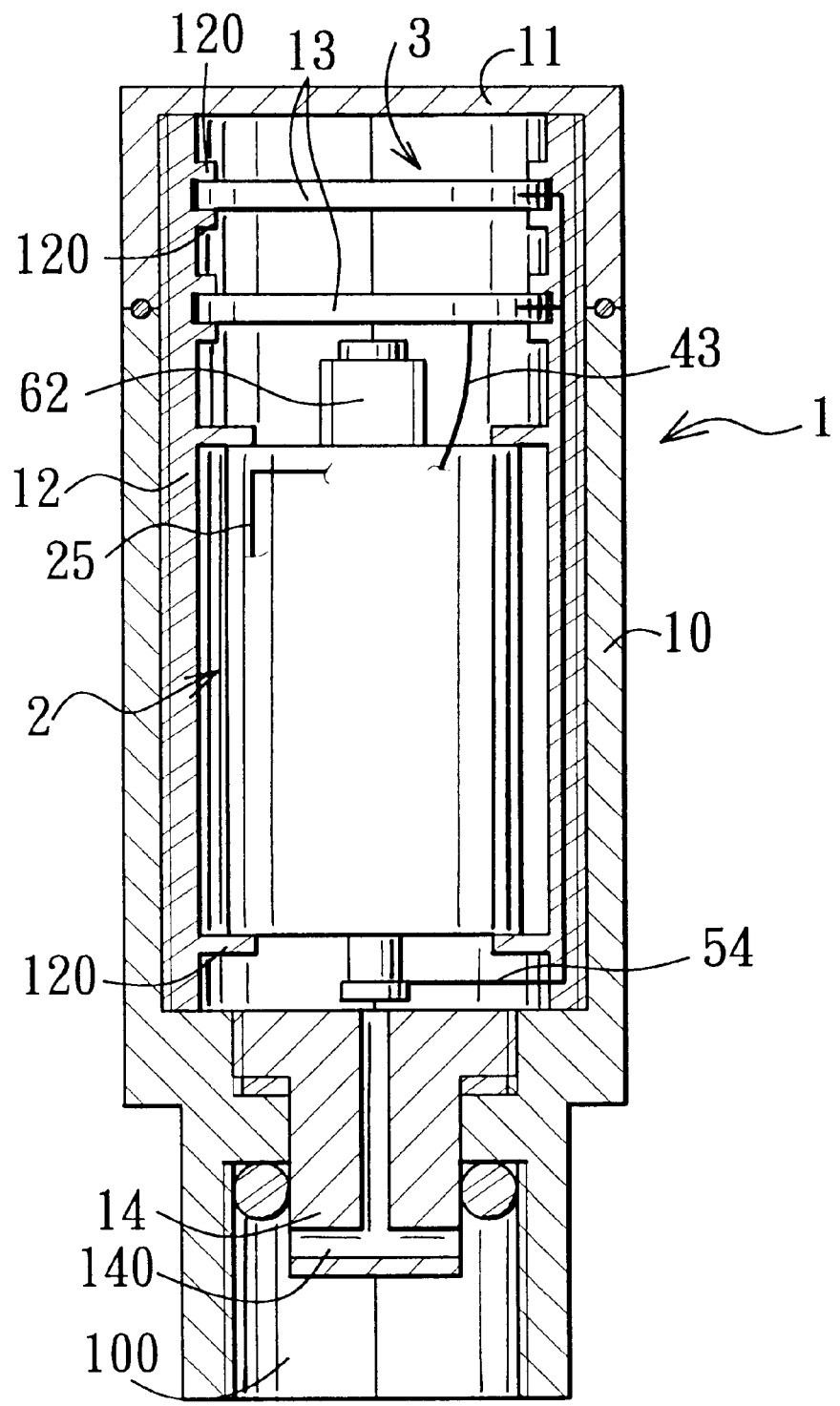
F I G. 1

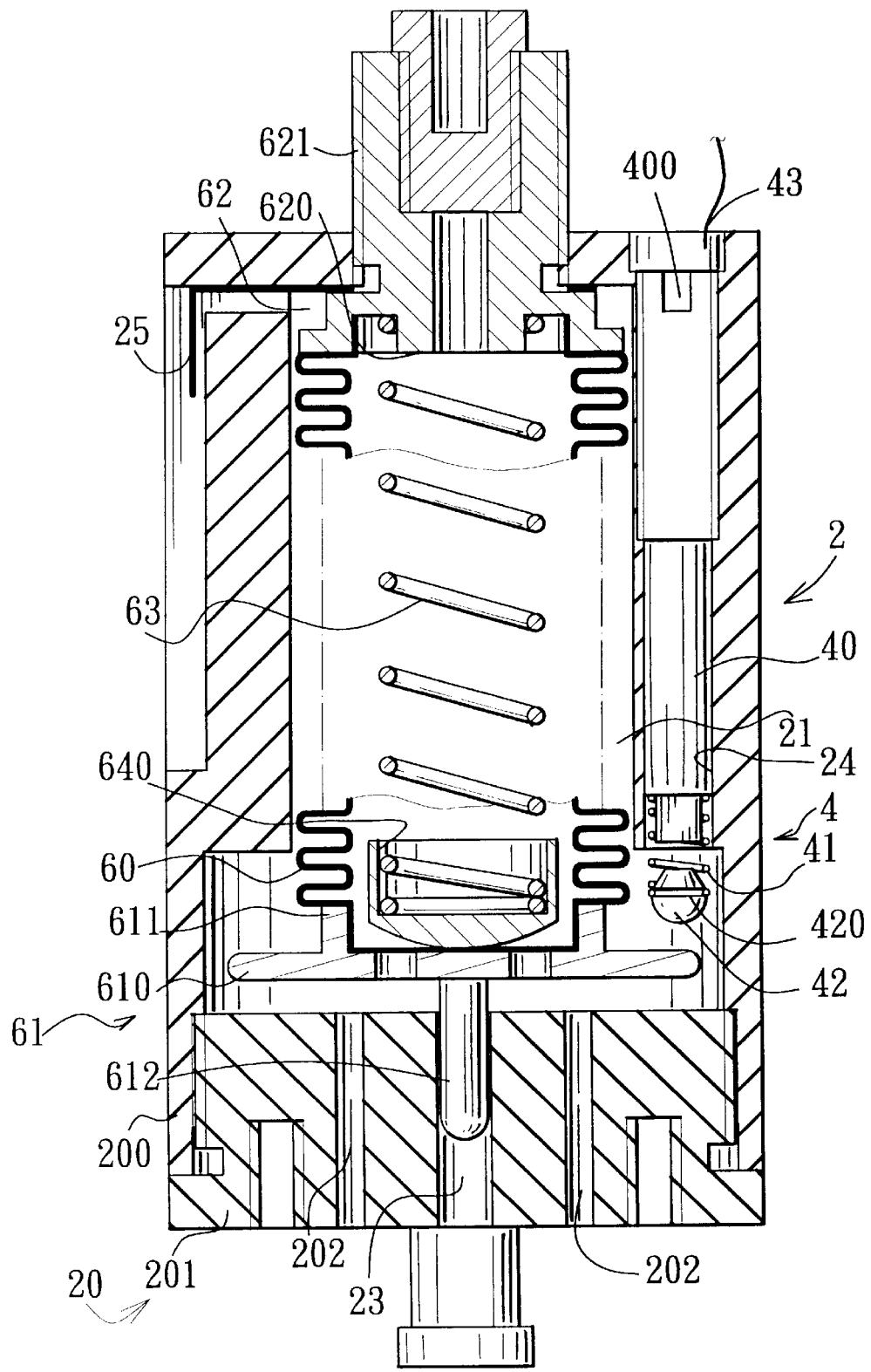
F I G. 3

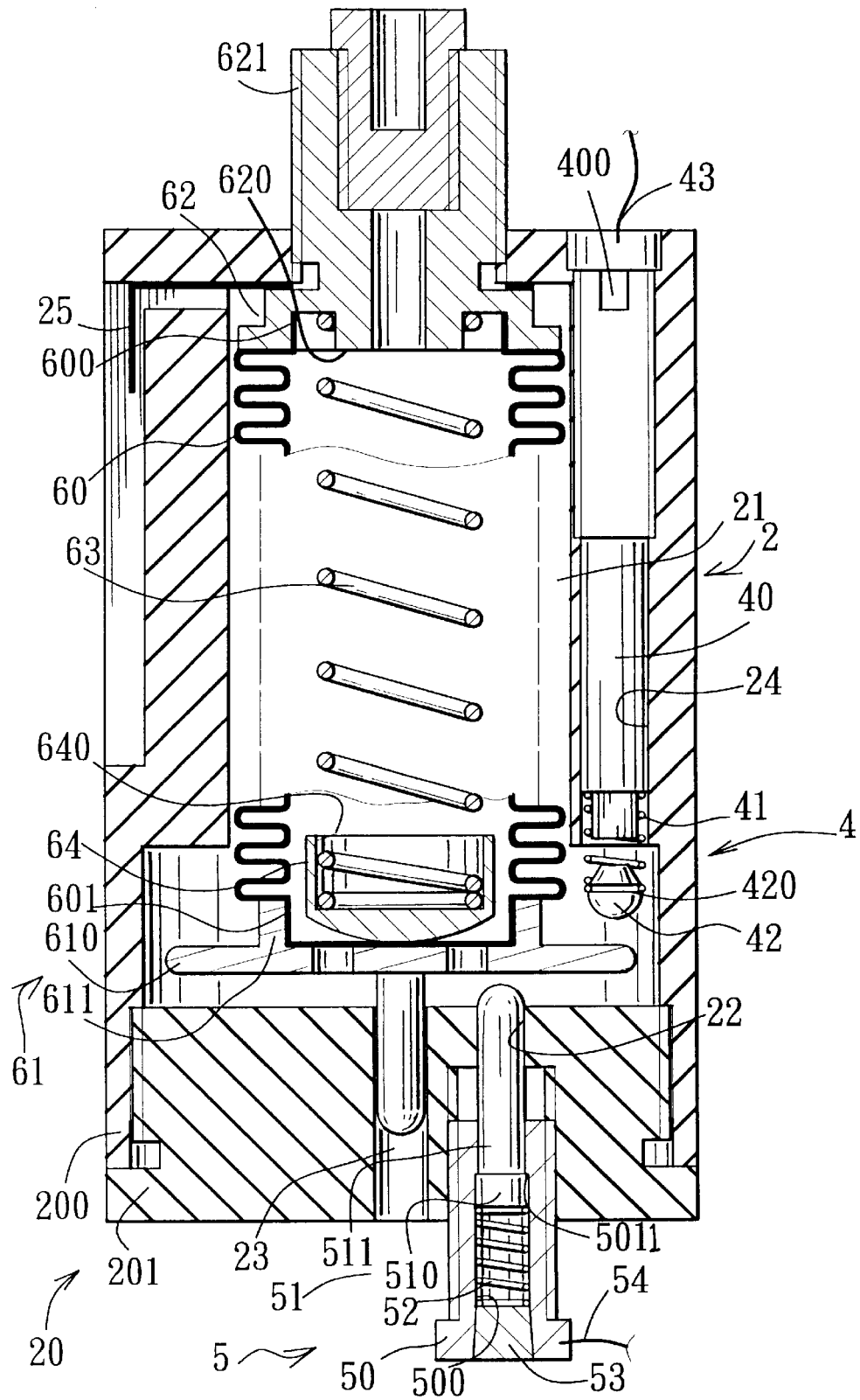
F I G. 4

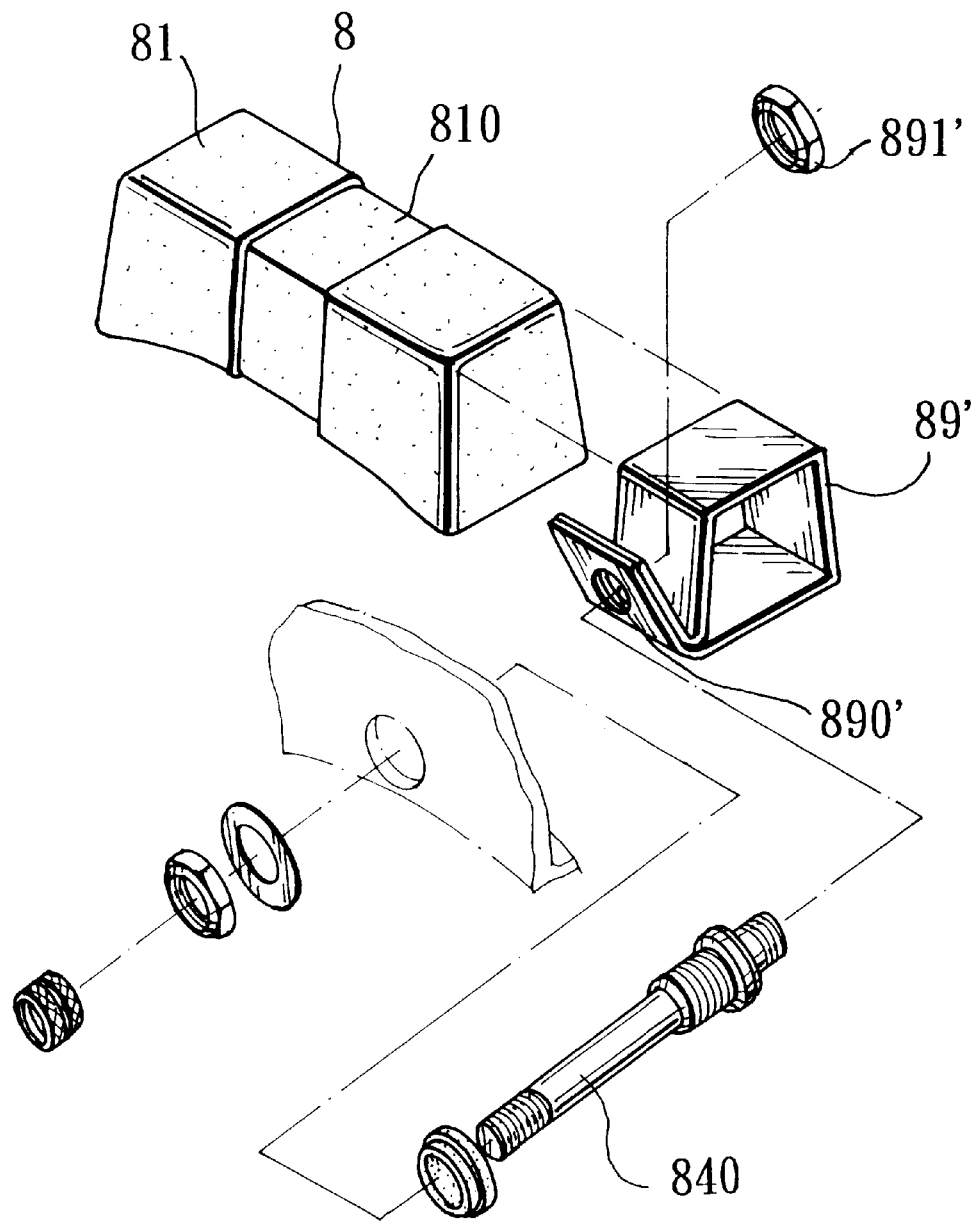
F I G. 12

PRESSURE GAUGE FOR A PNEUMATIC TIRE

BACKGROUND OF THE INVENTION

1. Field of the Invention

The invention relates to a pressure gauge for a pneumatic tire, more particularly to a pressure gauge which has a relatively high reliability and a relatively long service life, and which can be installed at different locations on a pneumatic tire.

2. Description of the Related Art

U.S. Pat. No. 5,289,161 discloses a pressure gauge for a pneumatic tire of a vehicle. The pressure gauge includes a casing having a hollow adaptor to be attached to the pneumatic tire, an inlet, and a finger piece for opening an inflating valve of the pneumatic tire. A diaphragm is disposed inside the casing adjacent to the inlet and is movable, in response to pressure imposed on the inlet, between a first position in which the pressure is below a predetermined low pressure limit, and a second position in which the pressure is above a predetermined high pressure limit. A spring-loaded push rod is mounted movably in the casing, and is moved by the diaphragm. A signal-transmitting unit is provided inside the casing, and has first and second switch devices which are controlled by the movement of the push rod. The first switch device activates the signal-transmitting unit to transmit a first code when the diaphragm is in the first position, thereby indicating an under-inflated condition. The second switch device activates the signal-transmitting unit to transmit a second code when the diaphragm is in the second position, thereby indicating an over-inflated condition.

Although the aforementioned pressure gauge is capable of indicating an under-inflated or over-inflated condition of the pneumatic tire to which it is applied, the pressure gauge suffers from the following drawbacks:

1. It is difficult to align the locations of the first and second switch devices with the moving path of the push rod. In addition, the first and second switch devices cannot be adjusted to adjust the high and low pressure limits of the pressure gauge.

2. The reliability of the pressure gauge is relatively low, and the service life of the pressure gauge is relatively short. This is due primarily to the diaphragm, which easily experiences elastic fatigue after prolonged application of the pressure thereon, and to the first switch device, which is acted upon by the push rod for most of the time.

3. The pressure gauge is designed for installation only on the inflating valve of the pneumatic tire.

SUMMARY OF THE INVENTION

Therefore, the main object of the present invention is to provide a pressure gauge that permits adjustment of the high and low pressure limits thereof.

Another object of the present invention is to provide a pressure gauge that has a relatively high reliability and a relatively long service life as compared to the conventional pressure gauge described beforehand.

A further object of the present invention is to provide a pressure gauge that can be installed at different locations on a pneumatic tire.

According to the present invention, a pressure gauge for a pneumatic tire comprises a signal-transmitting unit and a pressure-sensing unit.

The signal-transmitting unit has a common signal line, a high-pressure signal line and a low-pressure signal line. The signal-transmitting unit is operable so as to transmit a first pressure signal when the common signal line is connected electrically to the high-pressure signal line, and so as to transmit a second pressure signal when the common signal line is connected electrically to the low-pressure signal line.

The pressure-sensing unit includes an inner casing, a pressure-responsive contact unit, a conductive high-pressure contact unit, and a conductive low-pressure contact unit.

The inner casing has opposite first and second walls, and confines a receiving space with an axis that extends between the first and second walls. The second wall is formed with an air hole therethrough. The air hole is adapted to permit entry of air in the pneumatic tire into the receiving space.

The pressure-responsive contact unit includes an air impervious and length variable tubular member disposed in the inner casing and extending along the axis of the receiving space of the inner casing. The tubular member has a stationary end mounted on the first wall, and a movable end opposite to the stationary end and movable toward and away from the second wall in response to pressure of the air entering into the receiving space. The pressure-responsive contact unit further includes a conductive contact member mounted on the movable end of the tubular member and connected electrically to the common signal line.

The conductive high-pressure contact unit is mounted on the first wall beside the tubular member and extends toward the conductive contact member such that the conductive contact member makes physical contact with the high-pressure contact unit when the pressure of the air entering into the receiving space is above a high pressure limit. The high-pressure contact unit is connected electrically to the high-pressure signal line such that the high-pressure signal line is connected electrically to the common signal line when the conductive contact member makes physical contact with the high-pressure contact unit.

The conductive low-pressure contact unit is mounted on the second wall and extends toward the conductive contact member such that the conductive contact member makes physical contact with the low-pressure contact unit when the pressure of the air entering into the receiving space is below a low pressure limit. The low-pressure contact unit is connected electrically to the low-pressure signal line such that the low-pressure signal line is connected electrically to the common signal line when the conductive contact member makes physical contact with the low-pressure contact unit.

BRIEF DESCRIPTION OF THE DRAWINGS

Other features and advantages of the present invention will become apparent in the following detailed description of the preferred embodiments with reference to the accompanying drawings, of which:

FIG. 1 is a schematic sectional view illustrating the first preferred embodiment of a pressure gauge according to the present invention;

FIG. 3 is a longitudinal sectional view of the pressure-sensing unit of FIG. 2;

FIG. 4 is another longitudinal sectional view of the pressure-sensing unit of FIG. 2;

FIG. 12 is an exploded perspective view illustrating the fourth preferred embodiment of a pressure gauge according to the present invention.

DETAILED DESCRIPTION OF THE PREFERRED EMBODIMENTS

Figure 2:
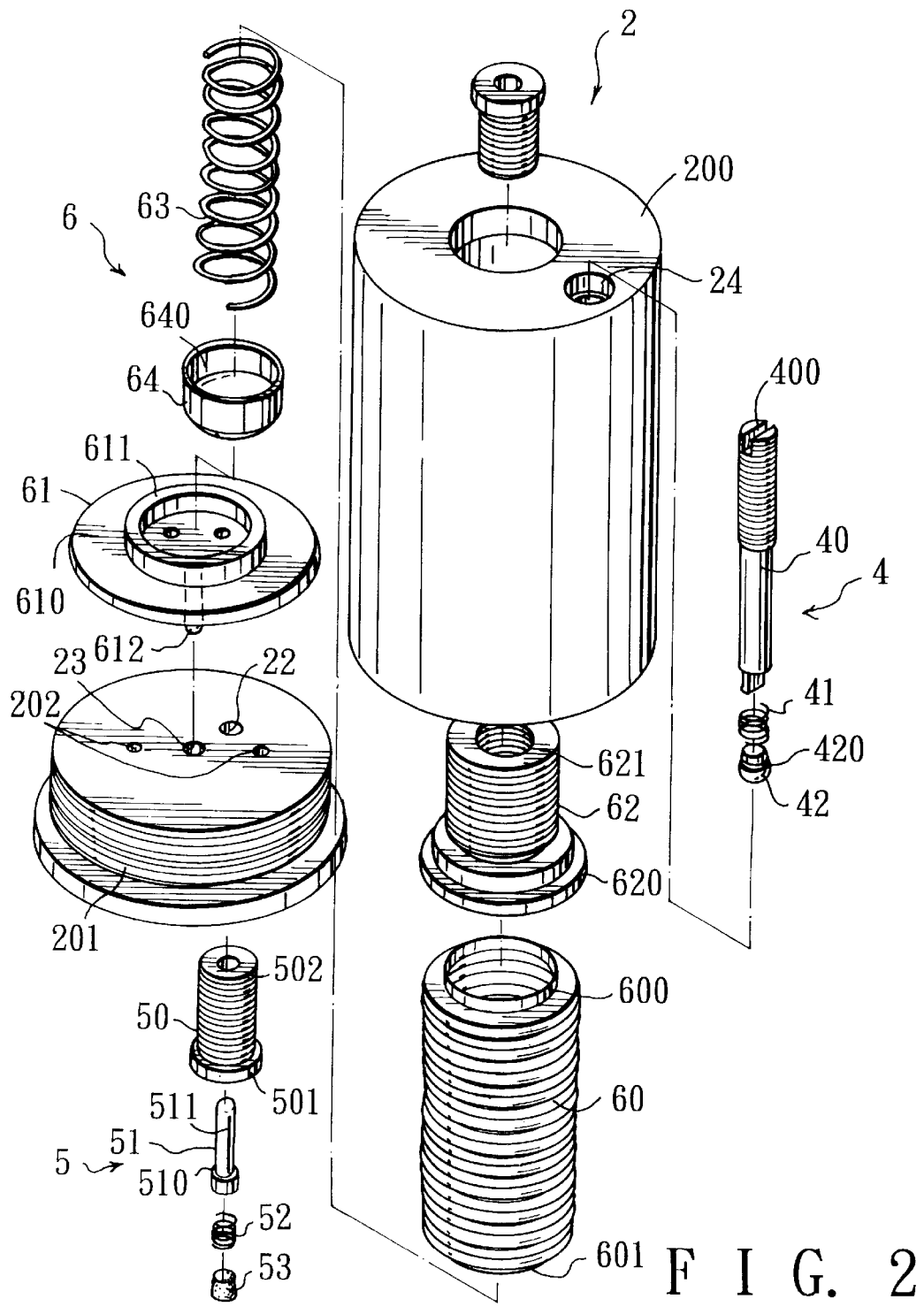
FIG. 2 is an exploded perspective view illustrating a pressure-sensing unit of the first preferred embodiment.

Before the present invention is described in greater detail, it should be noted that like elements are denoted by the same reference numerals throughout the disclosure.

Referring to FIG. 1, the first preferred embodiment of a pressure gauge according to the present invention is shown to comprise an outer casing 1, a pressure-sensing unit 2, and a signal-transmitting unit 3.

The outer casing 1 includes a lower casing part 10 and an upper cover part 11 mounted on an open top end of the lower casing part 10 and forming an airtight seal therewith. The lower casing part 10 and the upper cover part 11 are threaded internally, and an externally threaded hollow retainer 12 engages threadedly the lower and upper cover parts 10, 11. The hollow retainer 12 is formed from complimentary semi-circular retainer halves, and has an inner wall surface formed with a plurality of edge supporting ribs 120. A pair of circuit boards 13 and the pressure-sensing unit 2 are retained inside an accommodating space of the hollow retainer 12 via the edge supporting ribs 120. The signal-transmitting unit 3 is mounted on the circuit boards 13. A finger piece 14 is mounted threadedly within an open bottom end 100 of the lower casing part 10, and forms an airtight seal therewith. The finger piece 14 is formed with an air inlet 140. The bottom end 100 of the lower casing part 10 is formed with an internal screw thread in order to permit mounting of the outer casing 1 on an inflating valve of a pneumatic tire (not shown). When the outer casing 1 is mounted on the inflating valve, the inflating valve is opened by the finger piece 14 to permit air in the pneumatic tire to flow into the outer casing 1 via the air inlet 140. Referring to FIGS. 2, 3 and 4, the pressure-sensing unit 2 includes an inner casing 20, a conductive high-pressure contact unit 4, a conductive low-pressure contact unit 5, and a pressure-responsive contact unit 6.

The inner casing 20 is formed from a dielectric material, and includes an upper casing part 200 and a lower cover part 201 mounted threadedly on an open bottom end of the upper casing part 200. The upper casing part 200 has a top wall, and the lower cover part 201 has a bottom wall. The inner casing 20 confines a receiving space 21 with an axis that extends between the top wall of the upper casing part 200 and the bottom wall of the lower cover part 201. The bottom wall of the lower cover part 201 is formed with two air holes 202 that extend parallel to the axis of the receiving space 21 and that permit air flowing into the outer casing 1 to enter into the receiving space 21. The bottom wall of the lower cover part 201 is further formed with a first mounting hole 22 and a central guide hole 23 between the air holes 202. The first mounting hole 22 and the central guide hole 23 extend parallel to the axis of the receiving space 21. The first mounting hole 22 is formed with an internal screw thread, and is used for mounting the conductive low-pressure contact unit 5 on the inner casing 20. The top wall of the upper casing part 200 is formed with a second mounting hole 24 that extends parallel to the axis of the receiving space 21. The second mounting hole 24 is formed with an internal screw thread, and is used for mounting the conductive high-pressure contact unit 4 on the inner casing 20. The pressure-responsive contact unit 6 is made from an electrically conductive material, and is connected electrically to a common signal line 25. The pressure-responsive contact unit 6 is disposed in the receiving space 21, and includes an air impervious and length variable tubular member 60, a conductive contact member 61, a conductive mounting member 62, a conductive biasing member 63 and a conductive seat member 64.

In this embodiment, the tubular member 60 is formed as a bellows tube that extends along the axis of the receiving space 21, and has a stationary end 600 and a movable end 601 opposite to the stationary end 600. The contact member 61 has a contact plate portion 610 that is disposed transverse to the axis of the receiving space 21, and a ring portion 611 that extends from the contact plate portion 610 toward the top wall of the upper cover part 200. The movable end 601 of the tubular member 60 extends into the ring portion 611, and is connected to an inner wall surface of the ring portion 611 to form an airtight seal therewith. The mounting member 62 has an inner end portion 620 disposed in the receiving space 21, and an outer end portion 621 that extends outwardly of the inner casing 20 via the top wall of the upper casing part 200. The outer end portion 621 is formed with an external screw thread and is mounted on the top wall of the upper casing part 200. The stationary end 600 of the tubular member 60 is connected to the inner end portion 620 of the mounting member 62, such as by welding, to form an airtight seal therewith. Thus, the tubular member 60 confines a closed space therein. The movable end 601 of the tubular member 60 and the contact member 61 move toward and away from the bottom wall of the lower cover part 201 in response to pressure of the air entering into the receiving space 21. The contact member 61 further has a guide rod 612 that extends from the contact plate portion 610 and slidably into the central guide hole 23 in the lower cover part 201 so as to ensure that movement of the contact member 61 only occurs along the axis of the receiving space 21. In this embodiment, the biasing member 63 is a coil spring disposed inside the tubular member 60 for biasing the contact plate portion 610 of the contact member 61 toward the lower cover part 201. The biasing member 63 has an upper end abutting against the inner end portion 620 of the mounting member 62, and an opposite lower end. The seat member 64 is disposed inside the tubular member 60 between the biasing member 63 and the contact member 61, and has an upper side formed with a recess 640 to receive the lower end of the biasing member 63.

The high-pressure contact unit 4 is made from an electrically conductive material, and is connected electrically to a high-pressure signal line 43. The high-pressure contact unit 4 includes an adjustment rod 40, a coil spring 41 and a contact element 42.

The adjustment rod 40 is formed with an external screw thread, and is mounted threadedly in the second mounting hole 24. The adjustment rod 40, which is disposed beside the tubular member 60 and which extends parallel to the axis of the receiving space 21, has an operating end formed with a bit engaging slot 400, and a supporting end that is opposite to the operating end. The coil spring 41 has a first end connected securely to the supporting end of the adjustment rod 40, and an opposite second end. The contact element 42 is formed with an annular groove 420 for engaging the second end of the coil spring 41. As such, the contact element 42 is suspended from the supporting end of the adjustment rod 40 via the coil spring 41, and is disposed directly above the contact plate portion 610 of the contact member 61. The low-pressure contact unit 5 is made from an electrically conductive material, and is connected electrically to a low-pressure signal line 54. The low-pressure contact unit 5 includes a tubular mounting seat 50, a contact rod 51, a biasing unit 52, and a plug 53.

The mounting seat 50 is formed with an axially extending passage 500 to receive the contact rod 51, the biasing unit 52 and the plug 53 in sequence. The mounting seat 50, which is formed with an external screw thread, is mounted threadedly in the first mounting hole 22 and extends parallel to the axis of the receiving space 21. The mounting seat 50 has an operating section 501 and a distal section 502 opposite to the operating section 501 and proximate to the receiving space 21. The distal section 502 is formed with a radial inward shoulder 5011. The contact rod 51 has a head portion 510 disposed slidably in the passage 500, and a shank portion 511 narrower than the head portion 510. The shank portion 511 extends from the head portion 510 into the receiving space 21 directly below the contact plate portion 610 of the contact member 61 via the distal section 502 of the mounting seat 50. The plug 53 blocks the passage 500 at the operating section 501 of the mounting seat 50. The biasing unit 52, which is in the form of a coil spring, is disposed between the plug 53 and the head portion 510 of the contact rod 51, and urges the head portion 510 of the contact rod 51 against the shoulder 5011.

Under a normal tire pressure condition, the pressure in the receiving space 21 is sufficient to move the contact member 61 so that the contact plate portion 610 thereof is disposed between and does not make physical contact with either of the contact element 42 and the contact rod 51, as shown in FIG. 4. The common signal line 25 is not connected to either of the high-pressure signal line 43 and the low-pressure signal line 54 at this time.

Figure 5:
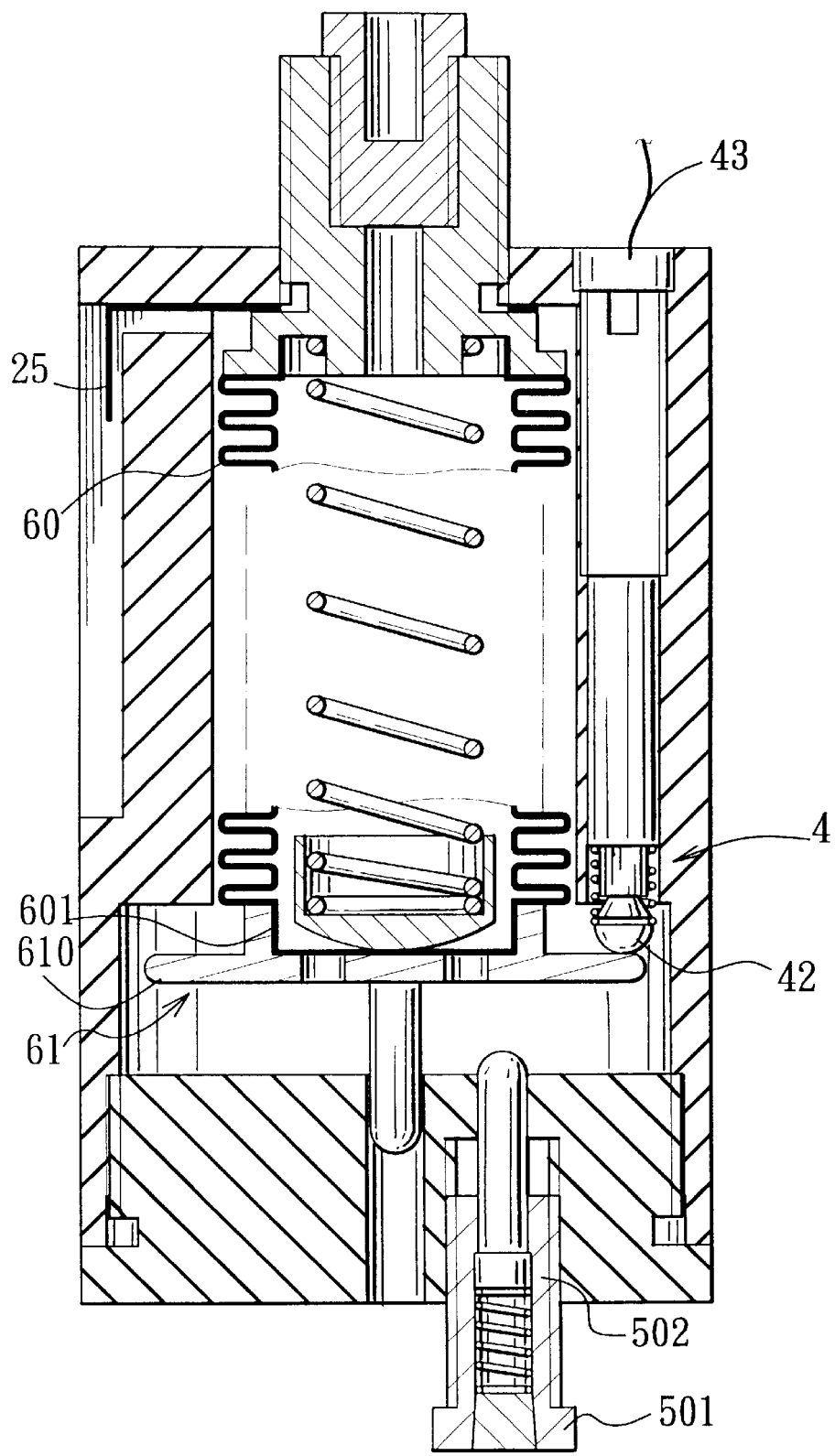
FIG. 5 is a longitudinal sectional view illustrating the pressure-sensing unit in the event of an over-inflated tire pressure condition.

In the event of an over-inflated condition in the pneumatic tire to which the pressure gauge is applied, the contact plate portion 610 of the contact member 61 is moved upwardly by a distance sufficient to establish physical contact with the contact element 42, thereby connecting electrically the common signal line 25 and the high-pressure signal line 43, as shown in FIG. 5. With the use of a tool (not shown) that engages the bit engaging slot 400, the adjustment rod 40 can be threaded into and out of the top wall of the upper cover part 200 to adjust an initial distance between the contact element 42 and the contact plate portion 610 of the contact member 61, thereby adjusting a high pressure limit for the pressure gauge.

Figure 6:
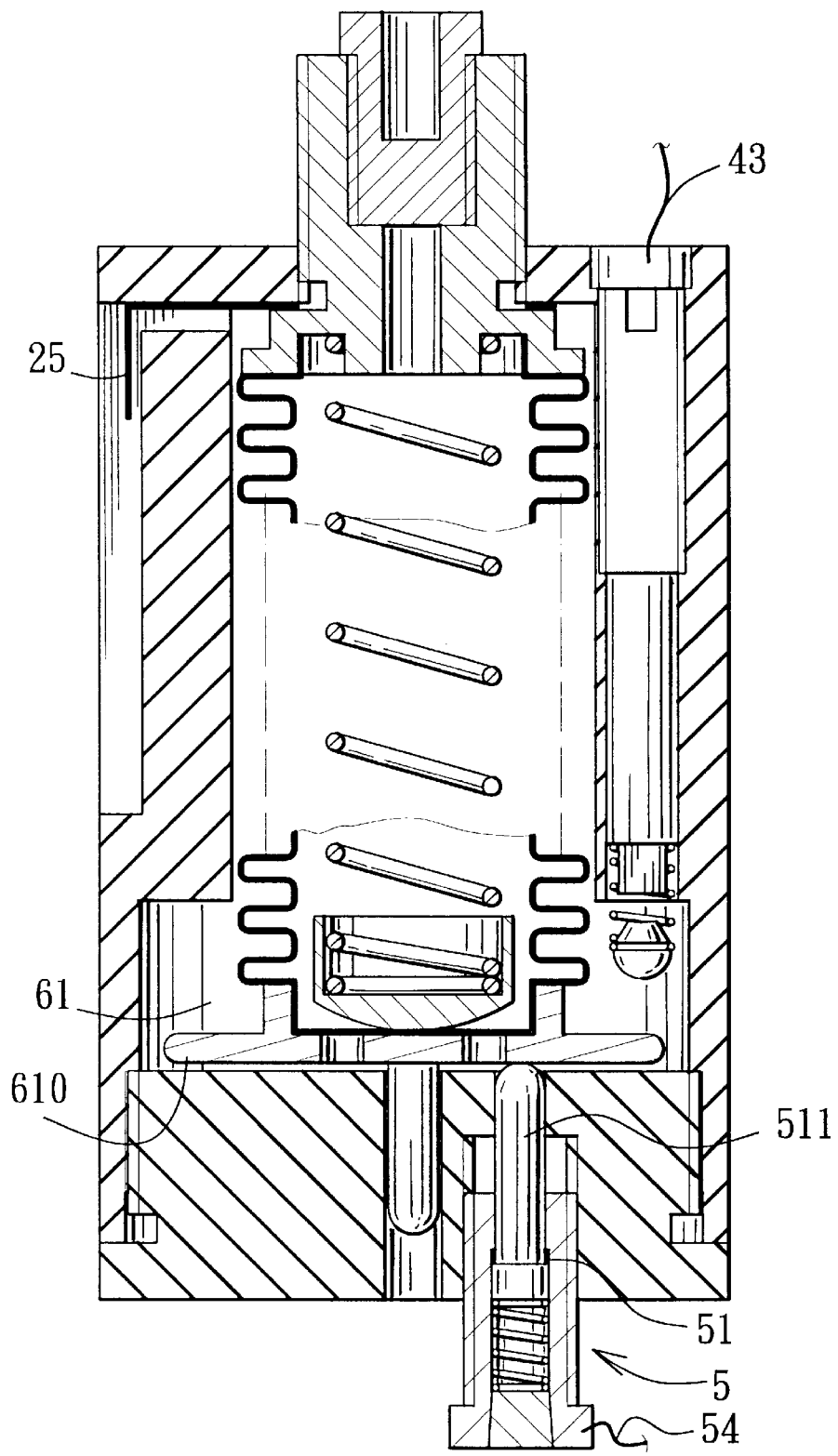
FIG. 6 is a longitudinal sectional view illustrating the pressure-sensing unit in the event of an under-inflated tire pressure condition.

In the event of an under-inflated condition in the pneumatic tire to which the pressure gauge is applied, the pressure entering into the receiving space 21 is insufficient to overcome the force of the biasing member 63. As such, the contact plate portion 610 of the contact member 61 moves to establish physical contact with the contact rod 51 and force the shank portion 511 of the contact rod 51 into the passage 500 against the action of the biasing unit 52, as shown in FIG. 6. The common signal line 25 and the low-pressure signal line 54 are connected electrically at this time. By rotating the operating section 501 of the mounting seat 50 to thread the latter into and out of the bottom wall of the lower cover part 201, an initial degree of extension of the shank portion 511 of the contact rod 51 into the receiving space 21 can be adjusted, thereby adjusting a low pressure limit for the pressure gauge.

Figure 7:
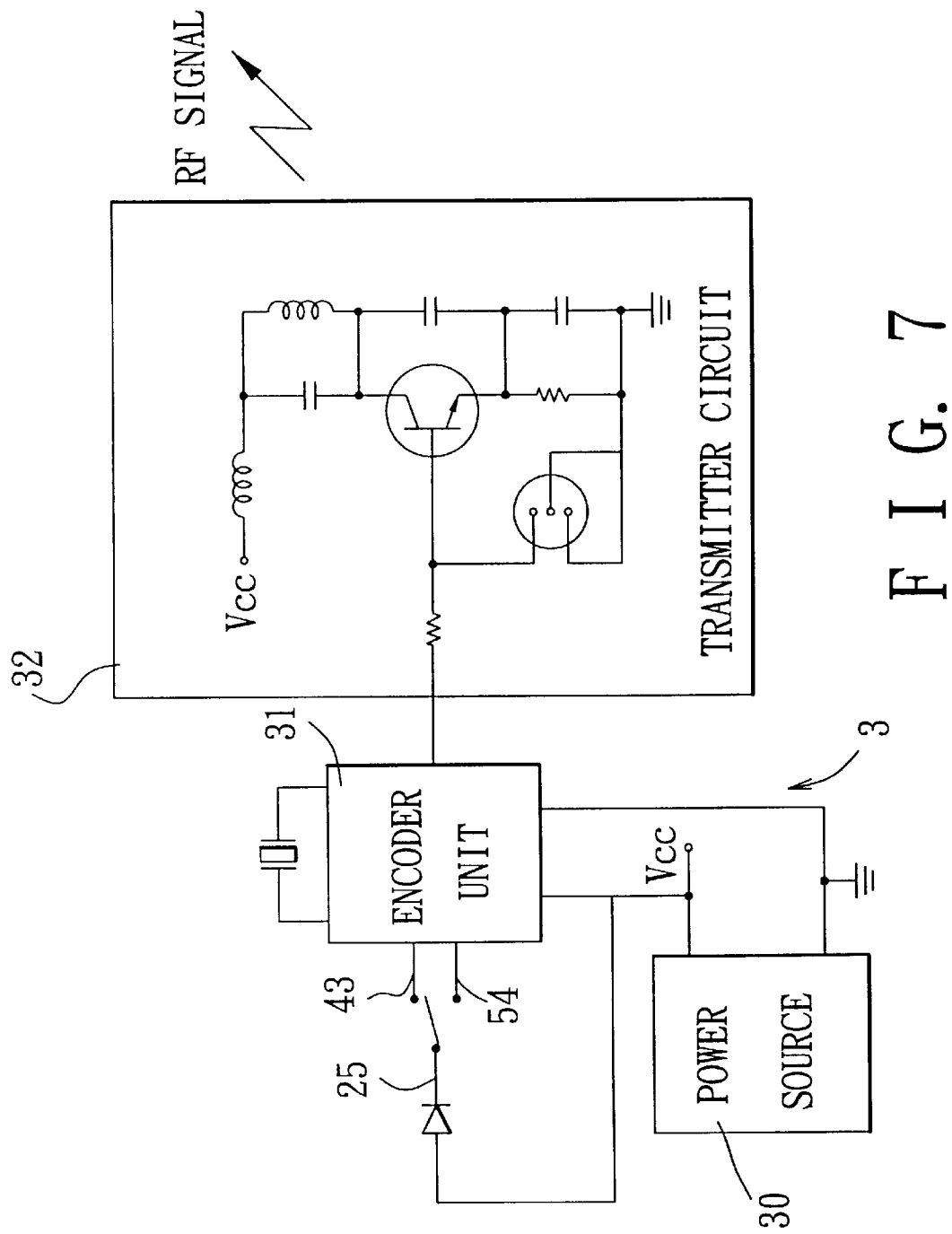
FIG. 7 is a schematic electrical circuit diagram illustrating a signal-transmitting unit of the first preferred embodiment.

Referring to FIGS. 1 and 7, the common signal line 25 and the high-pressure and low-pressure signal lines 43, 54 are connected electrically to the signal-transmitting unit 3 on the circuit boards 13 inside the accommodating space of the hollow retainer 12. The signal-transmitting unit 3 includes a power source 30, an encoder unit 31 and a transmitter circuit 32. The common signal line 25 is connected to the power source 30. The high-pressure and low-pressure signal lines 43, 54 are connected to the encoder unit 31. The encoder unit 31 is inactive when the common signal line 25 is not connected to either of the high-pressure and low-pressure signal lines 43, 54. When the common signal line 25 is connected electrically to the high-pressure signal line 43, the encoder unit 31 generates a first pressure signal to indicate an over-inflated condition. When the common signal line 25 is connected electrically to the low-pressure signal line 54, the encoder unit 31 generates a second pressure signal to indicate an under-inflated condition. The transmitter circuit 32 is connected to the encoder unit 31, and wirelessly transmits the pressure signal that is generated by the encoder unit 31.

Figure 8:
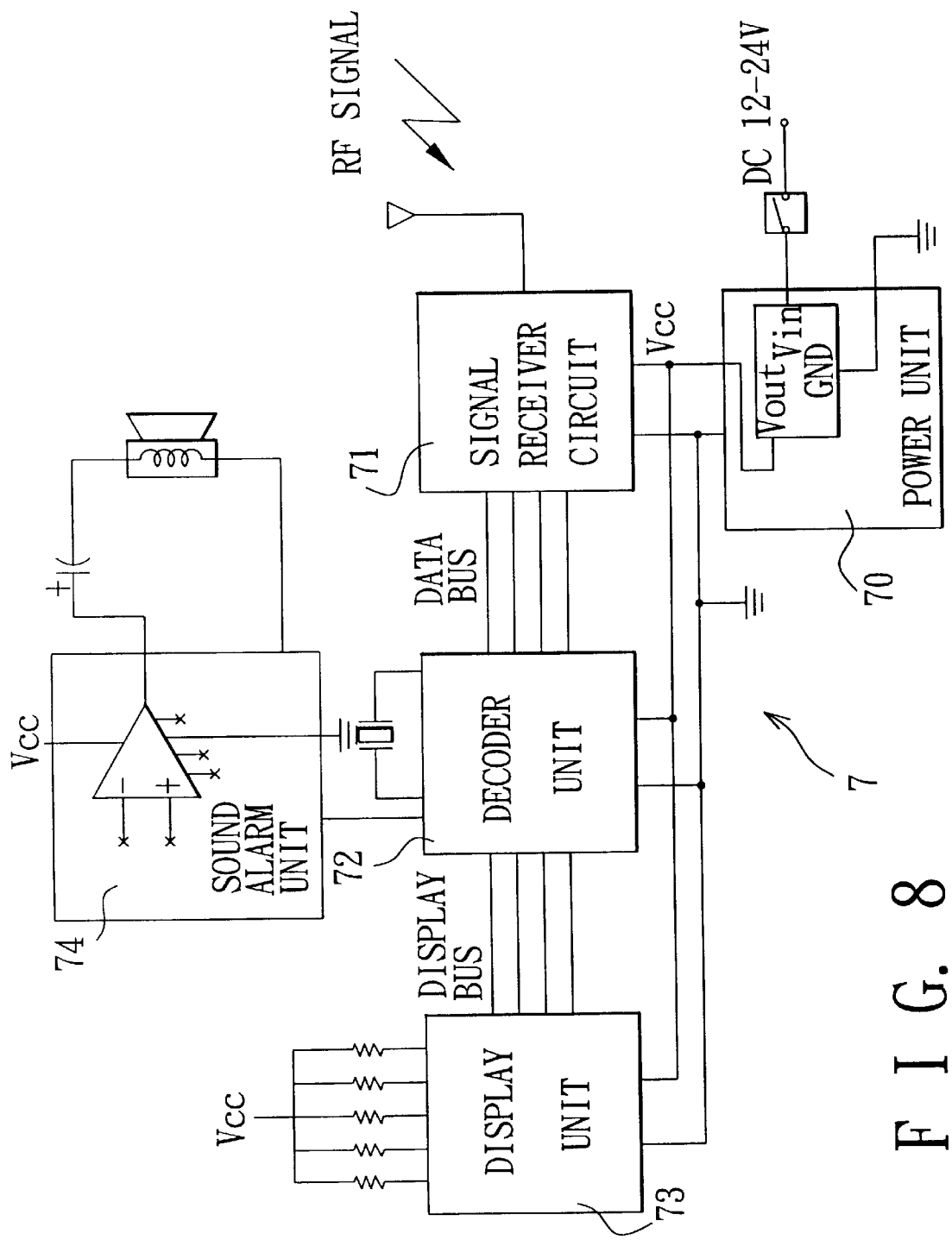
FIG. 8 is a schematic circuit block diagram illustrating a receiver device for use with the signal-transmitting unit of FIG. 7.

FIG. 8 illustrates a receiver device 7 for use with the pressure gauge of this invention. The receiver device 7 is disposed inside the driver room of a vehicle so as to be easily seen by the driver of the vehicle. The receiver device 7 can be built as a part of the instrument panel of the vehicle, or as a separate device to be installed in the driver room of the vehicle. The receiver device 7 includes a power unit 70, a signal receiver circuit 71, a decoder unit 72, a display unit 73, and a sound alarm unit 74.

The signal receiver circuit 71 receives and demodulates the pressure signal transmitted by the signal-transmitting unit 3 of the pressure gauge, and provides the same to the decoder unit 72. The display unit 73 is controlled by the decoder unit 72 so as to indicate thereon which one of the pneumatic tires of the vehicle is under-inflated or over-inflated. The sound alarm unit 74 is controlled by the decoder unit 72 so as to generate an audible alarm output for alerting the driver of the vehicle in the event of an under-inflated or over-inflated condition. The power unit 70 is connected to a 12–24 volt DC battery of the vehicle, and supplies the electric power required by the receiver device 7.

Figure 9:
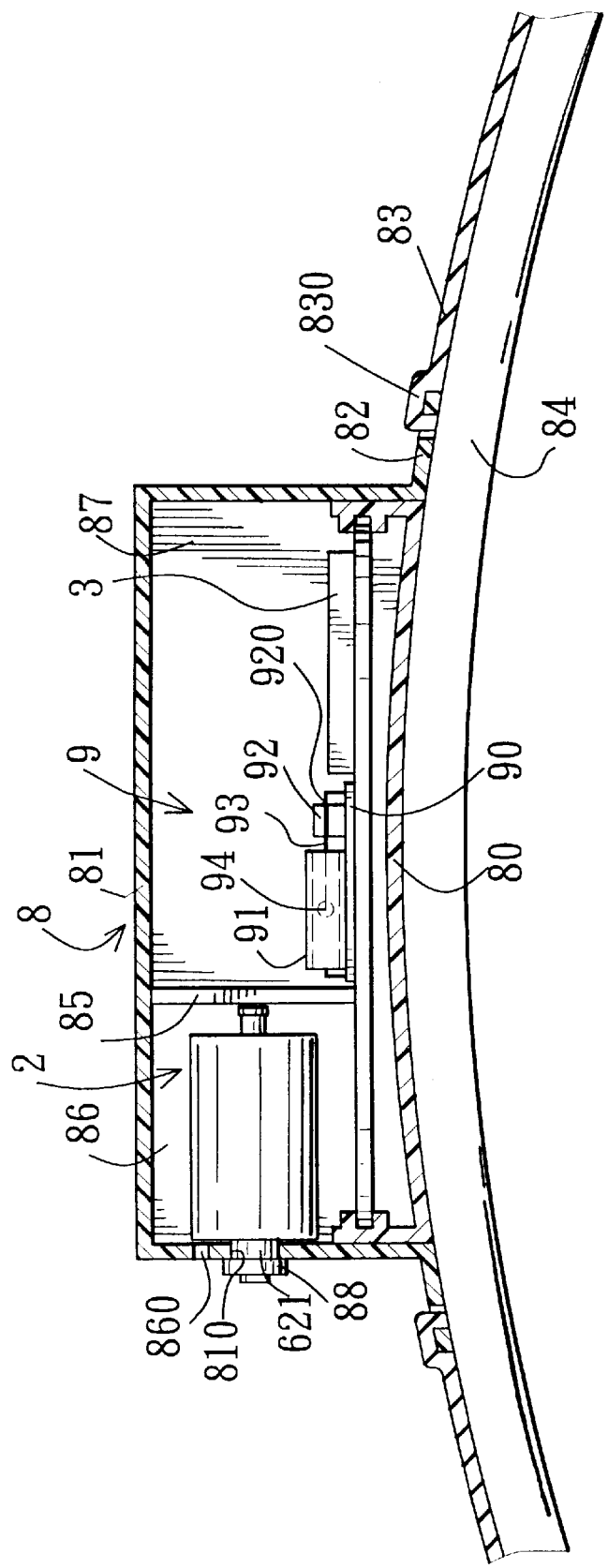
FIG. 9 illustrates how the second preferred embodiment of a pressure gauge according to the present invention is mounted on a pneumatic tire.

FIG. 9 illustrates the second preferred embodiment of a pressure gauge according to the present invention. Unlike the previous embodiment, the outer casing 8 of the pressure gauge of the second preferred embodiment is adapted to be secured on a metal wheel 84 of the pneumatic tire. The outer casing 8 includes a base portion 80 and an upper cover portion 81 with an open bottom end that is closed by the base portion 80. The base portion 80 has opposite ends formed with a pair of hook-engaging lugs 82. A positioning strap 83 extends around the metal wheel 84, and has opposite ends provided with a pair of hook units 830 to engage the hook-engaging lugs 82, thereby retaining the outer casing 8 on the metal wheel 84. Preferably, the base portion 80 has a curvature that corresponds to that of the metal wheel 84 so as to abut tightly against the same. A partition plate 85 separates an accommodating space confined by the upper cover portion 81 into first and second compartments 86, 87.

The pressure-sensing unit 2 is mounted in the first compartment 86, while the signal-transmitting unit 3 is mounted in the second compartment 87. The upper cover portion 81 is formed with an opening 810 that permits the outer end portion 621 of the mounting member 62 of the pressure-sensing unit 2 to extend therethrough. An internally threaded nut fastener 88 engages threadedly the outer end portion 621 of the mounting member 62, and abuts against an outer side of the upper cover portion 81, thereby mounting the pressure-sensing unit 2 onto the upper cover portion 81. The upper cover portion 81 is further formed with an air inlet 860 that is in fluid communication with the first compartment 86. Thus, air in the pneumatic tire can enter into the pressure-sensing unit 2 via the air inlet 860 and the first compartment 86. The pressure gauge of the second preferred embodiment further comprises a power source switch 9 that is associated operably with the power source 30 (see FIG. 7) of the signal-transmitting unit 3. The power source switch 9 includes a dielectric base 90, a conductive tube 91, a dielectric mounting piece 92, and a conductive spring plate 93.

The conductive tube 91 is mounted horizontally on the dielectric base 90 such that the conductive tube 91 is disposed circumferentially relative to the axis of rotation of the pneumatic tire. A first end of the conductive tube 91 is connected to a positive terminal of the power source 30. The mounting piece 92 is mounted on the dielectric base 90 adjacent to a second end of the conductive tube 91, and is formed with a retaining slot 920 therethrough. The spring plate 93 has one end connected to a negative terminal of the power source 30. The other end of the spring plate 93 extends through the retaining slot 920 in the mounting piece 92 and is provided with a ball contact 94. The other end of the spring plate 93 extends axially into the second end of the conductive tube 91. When the metal wheel 84 is stationary, the ball contact 94 does not make physical contact with the inner wall surface of the conductive tube 91. As such, an open circuit is not formed between the positive and negative terminals of the power source 30, and the signal-transmitting unit 3 does not operate at this time. When the metal wheel 84 rotates, a centrifugal force acts on the ball contact 94. When the centrifugal force is sufficient to overcome the force of the spring plate 93, the spring plate 93 bends to enable the ball contact 94 to establish physical contact with the inner wall surface of the conductive tube 91. Thus, a closed circuit is formed between the positive and negative terminals of the power source 30 to permit activation of the signal-transmitting unit 3. Therefore, the power source switch 9 allows operation of the signal-transmitting unit 3 only when the vehicle to which the pressure gauge is applied is in motion, thereby conserving the energy of the power source 30.

Figure 10:
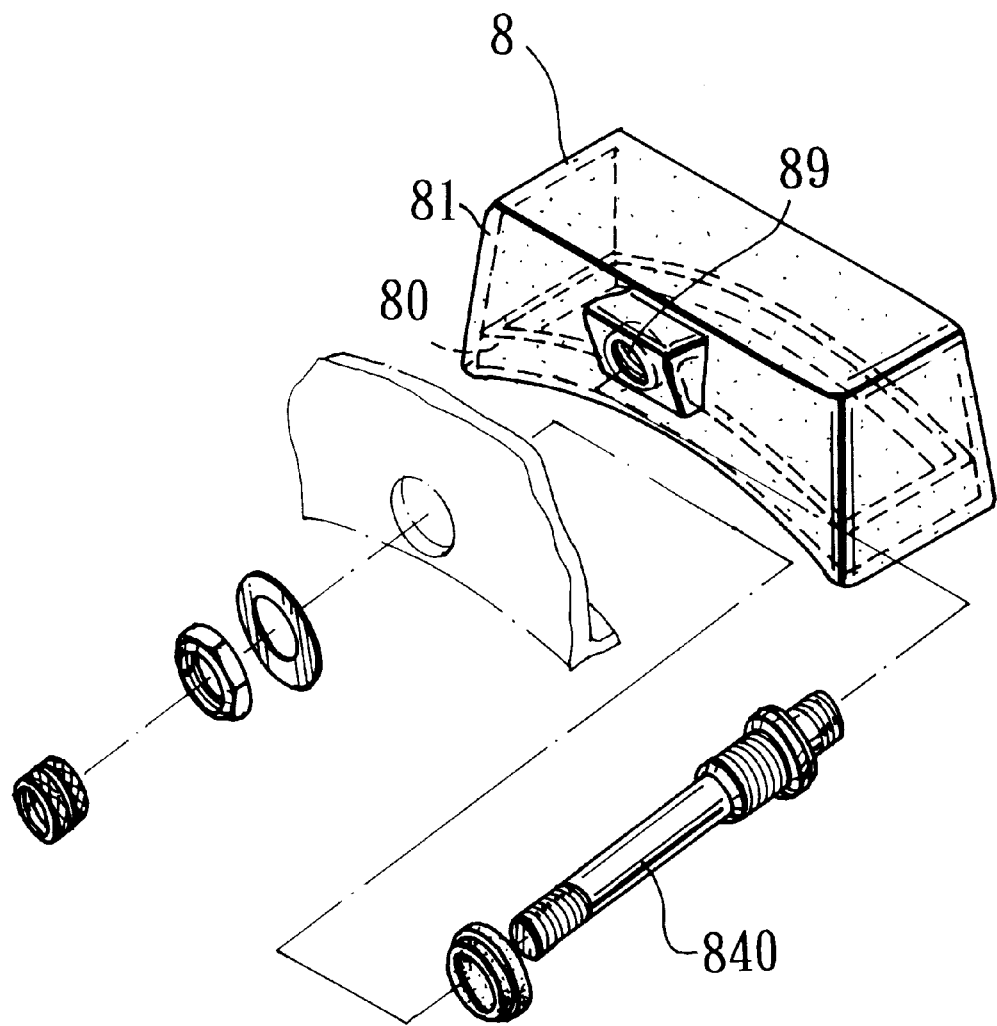
FIG. 10 is an exploded perspective view illustrating the third preferred embodiment of a pressure gauge according to the present invention.
Figure 11:
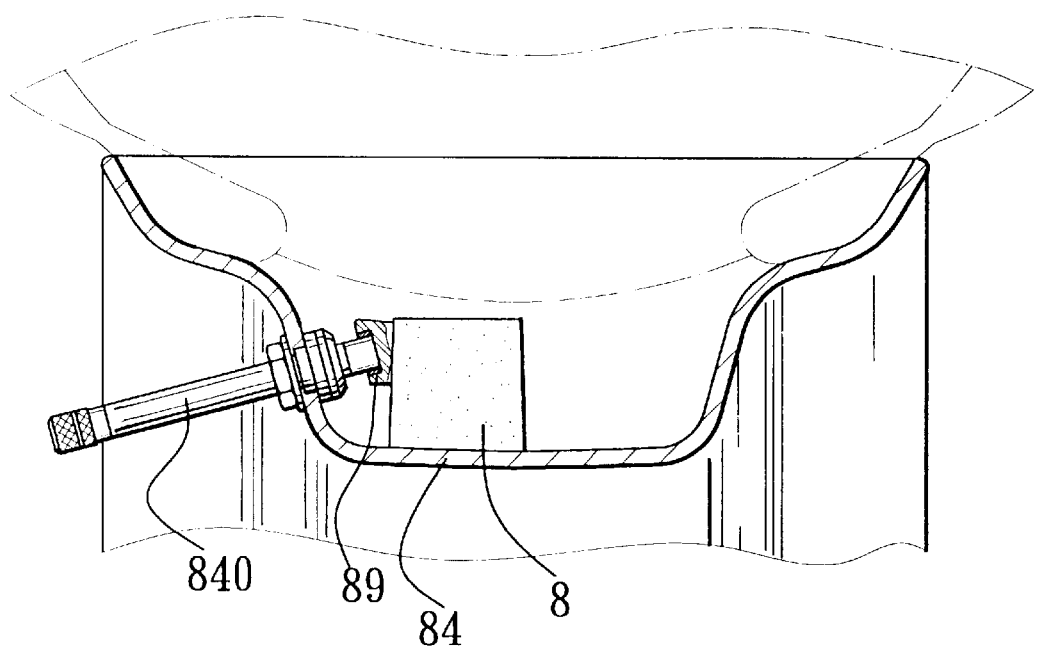
FIG. 11 illustrates how the pressure gauge of the third preferred embodiment is mounted on a pneumatic tire.
Figure 13:
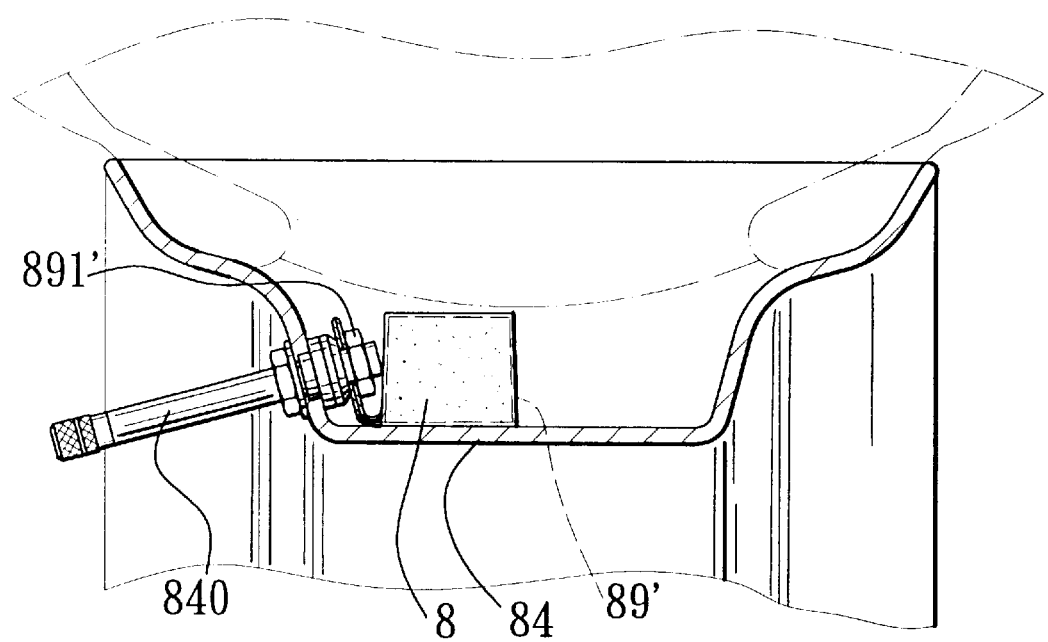
FIG. 13 illustrates how the pressure gauge of the fourth preferred embodiment is mounted on a pneumatic tire.

FIGS. 10 and 11 illustrate the third preferred embodiment of a pressure gauge according to the present invention. Like the second preferred embodiment, the pressure gauge has an outer casing 8 with a base portion 80 and an upper cover portion 81. However, unlike the second preferred embodiment, the base portion 80 is mounted on the metal wheel 84 by means of an adhesive medium, such as a double-sided adhesive tape. The upper cover portion 81 is formed with an internally threaded opening 89 for mounting the upper cover portion 81 on one end of an inflating valve 840 on the metal wheel 84. FIGS. 12 and 13 illustrate the fourth preferred embodiment of a pressure gauge according to the present invention. Unlike the second and third preferred embodiments, the upper cover portion 81 of the outer casing 8 is formed with a peripheral groove 810 therearound. A clasp member 89' is disposed around the outer casing 8 and is received in the peripheral groove 810. The clasp member 89' is formed from a bent metal plate, and has juxtaposed ends formed with aligned holes 890'. One end of an inflating valve 840 on the metal wheel 84 extends through the aligned holes 890' and engages a nut fastener 891', thereby mounting the outer casing 8 on the inflating valve 840. For added stability, the base portion of the outer casing 8 can be mounted on the metal wheel 84 by means of an adhesive medium, such as a double-sided adhesive tape.

The advantages of the pressure gauge of this invention are as follows:

1. The high and low pressure limits of the pressure gauge can be adjusted.

2. Unlike the aforesaid prior art, which employs a diaphragm that is susceptible to elastic fatigue, and which has a switch device that is acted upon by a push rod for most of the time, the pressure gauge of this invention employs a pressure-sensing unit 2 with a biasing member 63 that is normally in a compressed state. Thus, the reliability and the service life of the pressure gauge of this invention are better than those of the aforesaid prior art.

3. The pressure gauge can be installed at different locations on the pneumatic tire.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A pressure gauge for a pneumatic tire, comprising:
   a signal-transmitting unit having a common signal line, a high-pressure signal line and a low-pressure signal line, said signal-transmitting unit being operable so as to transmit a first pressure signal when said common signal line is connected electrically to said high-pressure signal line, and so as to transmit a second pressure signal when said common signal line is connected electrically to said low-pressure signal line; and
   a pressure-sensing unit including
      an inner casing having opposite first and second walls and confining a receiving space with an axis that extends between said first and second walls, said second wall being formed with an air hole therethrough, said air hole being adapted to permit entry of air in the pneumatic tire into said receiving space,
      a pressure-responsive contact unit including an air impervious and length variable tubular member disposed in said inner casing and extending along said axis of said receiving space of said inner casing, said tubular member having a stationary end mounted on said first wall and a movable end opposite to said stationary end and movable toward and away from said second wall in response to pressure of the air entering into said receiving space, said pressure-responsive contact unit further including a conductive contact member mounted on said movable end of said tubular member and connected electrically to said common signal line,
      a conductive high-pressure contact unit mounted on said first wall beside said tubular member and extending toward said conductive contact member such that said conductive contact member makes physical contact with said high-pressure contact unit when the pressure of the air entering into said receiving space is above a high pressure limit, said high-pressure contact unit being connected electrically to said high-pressure signal line such that said high-pressure signal line is connected electrically to said common signal line when said conductive contact member makes physical contact with said high-pressure contact unit, and a conductive low-pressure contact unit mounted on said second wall and extending toward said conductive contact member such that said conductive contact member makes physical contact with said low-pressure contact unit when the pressure of the air entering into said receiving space is below a low pressure limit, said low-pressure contact unit being connected electrically to said low-pressure signal line such that said low-pressure signal line is connected electrically to said common signal line when said conductive contact member makes physical contact with said low-pressure contact unit.

2. The pressure gauge as claimed in claim 1, wherein said conductive contact member includes a contact plate portion that is disposed transverse to said axis of said receiving space, and a ring portion that extends from said contact plate portion toward said first wall, said movable end of said tubular member being mounted on said ring portion and forming an airtight seal therewith.

3. The pressure gauge as claimed in claim 2, wherein said pressure-responsive contact unit further includes a biasing member disposed in said tubular member for biasing said contact plate portion of said conductive contact member toward said second wall.

4. The pressure gauge as claimed in claim 3, wherein said inner casing is made of a dielectric material, said biasing member is a conductive coil spring, and said pressure-responsive contact unit further includes a conductive seat member disposed in said tubular member between said biasing member and said conductive contact member and formed with a recess to receive one end of said biasing member.

5. The pressure gauge as claimed in claim 4, wherein said pressure-responsive contact unit further includes a conductive mounting member mounted on said first wall, said stationary end of said tubular member being mounted on said mounting member and forming an airtight seal therewith, said biasing member having an opposite end abutting against said mounting member.

6. The pressure gauge as claimed in claim 5, wherein said tubular member is a bellows tube.

7. The pressure gauge as claimed in claim 2, wherein said second wall is formed with a guide hole that extends parallel to said axis of said receiving space, said contact plate portion of said conductive contact member being formed with a guide rod that extends slidably into said guide hole to ensure movement of said conductive contact member along said axis of said receiving space.

8. The pressure gauge as claimed in claim 1, wherein said high-pressure contact unit includes:

an adjustment rod mounted threadedly on said first wall and extending parallel to said axis of said receiving space;

a coil spring having a first end connected securely to said adjustment rod, and an opposite second end; and a contact element mounted on said second end of said coil spring;

whereby, by threading said adjustment rod into and out of said first wall, an initial distance between said contact element and said contact plate portion of said conductive contact member can be adjusted to adjust the high pressure limit.

9. The pressure gauge as claimed in claim 8, wherein said adjustment rod, said coil spring and said contact element are made of a conductive material, and said inner casing is made of a dielectric material.

10. The pressure gauge as claimed in claim 1, wherein said low-pressure contact unit includes:

a tubular mounting seat formed with an axially extending passage, said mounting seat being mounted threadedly on said second wall and extending parallel to said axis of said receiving space, said mounting seat having a distal section proximate to said receiving space and formed with a radial inward shoulder;

a contact rod having a head portion disposed slidably in said passage, and a shank portion that is narrower than said head portion and that extends from said head portion into said receiving space toward said conductive contact member via said distal section of said mounting seat; and a biasing unit disposed in said passage to urge said head portion of said contact rod against said shoulder;

whereby, by threading said mounting seat into and out of said second wall, an initial degree of extension of said shank portion of said contact rod into said receiving space can be adjusted to adjust the low pressure limit.

11. The pressure gauge as claimed in claim 10, wherein said mounting seat, said contact rod and said biasing unit are made of a conductive material, and said inner casing is made of a dielectric material.

12. The pressure gauge as claimed in claim 1, further comprising an outer casing that confines an accommodating space to receive said signal-transmitting unit and said pressure-sensing unit therein, said outer casing being adapted to be attached to an inflating valve of a pneumatic tire and being provided with a finger piece that is adapted to open the inflating valve to enable air in the pneumatic tire to enter into said accommodating space.

13. The pressure gauge as claimed in claim 5, wherein said mounting member has an inner end portion disposed in said receiving space, and an outer end portion that extends outwardly of said inner casing through said first wall, said stationary end of said tubular member being mounted on said inner end portion of said mounting member, said biasing member abutting against said inner end portion of said mounting member.

14. The pressure gauge as claimed in claim 13, further comprising:

an outer casing confining an accommodating space to receive said signal-transmitting unit and said pressure-sensing unit therein, said outer casing being formed with an air inlet for entry of air into said accommodating space, and an opening that permits said outer end portion of said mounting member of said pressure-sensing unit to extend therethrough, said outer end portion of said mounting member being threaded externally; and a nut fastener engaging threadedly said outer end portion of said mounting member and abutting against said outer casing to secure said pressure-sensing unit on said outer casing.

15. The pressure gauge as claimed in claim 14, the pneumatic tire having a metal wheel, the pressure gauge further comprising a positioning strap adapted to be extended around the metal wheel so as to secure said outer casing on the metal wheel.

16. The pressure gauge as claimed in claim 15, wherein said outer casing has opposite ends formed with a pair of hook-engaging lugs, and said positioning strap has opposite ends provided with a pair of hook units to engage said hook-engaging lugs, respectively.

17. The pressure gauge as claimed in claim 1, further comprising a power source switch associated operably with said signal-transmitting unit so as to activate said signal-transmitting unit only when a sufficient amount of centrifugal force due to rotation of the pneumatic tire is present.

18. The pressure gauge as claimed in claim 17, wherein said power source switch comprises:

a conductive tube disposed circumferentially relative to axis of rotation of the pneumatic tire and connected to said signal-transmitting unit; and a conductive spring plate having one end connected to said signal-transmitting unit and an opposite end extending axially into said conductive tube;

whereby, when the sufficient amount of centrifugal force is present, said spring plate bends to make physical contact with said conductive tube and form a closed circuit with said signal-transmitting unit so as to activate said signal transmitting unit.

19. The pressure gauge as claimed in claim 1, the pneumatic tire having a metal wheel with an inflating valve thereon, the pressure gauge further comprising an outer casing that confines an accommodating space to receive said signal-transmitting unit and said pressure-sensing unit therein, said outer casing being adapted to be mounted adhesively on the metal wheel and being formed with an internally threaded opening adapted for engaging one end of the inflating valve.

20. The pressure gauge as claimed in claim 1, the pneumatic tire having a metal wheel with an inflating valve thereon, the pressure gauge further comprising an outer casing that confines an accommodating space to receive said signal-transmitting unit and said pressure-sensing unit therein, a clasp member disposed around said outer casing, and a fastener for fastening said clasp member on one end of the inflating valve.

* * * * *